Patented Oct. 13, 1953

2,655,517

UNITED STATES PATENT OFFICE 2,655,517

STEROID CYANOHYDRINS

George Slomp, Jr., Kalamazoo, Mich., assignor to The Upjohn Company, Kalamazoo, Mich., a corporation of Michigan No Drawing. Application May 3, 1952,
Serial No. 286,020

20 Claims. (Cl. 260—397.4)

This invention relates to the selective addition of hydrogen cyanide to a $\Delta^4$-3,20-diketosteriod and to the novel $\Delta^4$-3,20-diketosteroid-20-cyanohydrins thus produced.

The novel compounds of the present invention are $\Delta^4$-3,20-diketosteroid-20-cyanohydrins possessing a 17-hydrogen. Compounds of the present invention of particular interest are steroids represented by the following formula:

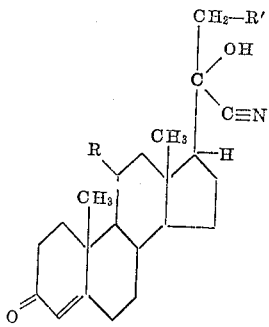

wherein R represents hydrogen, hydroxy, ketonic oxygen, or an acyloxy group, particularly acyloxy groups containing from one to eight carbon atoms, inclusive, such as, for example, alkanoyloxy, and wherein R' represents hydrogen, hydroxy, or an acyloxy group, particularly acyloxy groups containing from one to eight carbon atoms, inclusive, such as, for example, alkanoyloxy.

It is an object of the present invention to provide novel $\Delta^4$-3,20-diketosteroid-20-cyanohydrins. Another object is the provision of a novel process for the the production thereof. Other objects will be apparent to those skilled in the art to which this invention pertains.

The novel compounds of the present invention are prepared by reacting a $\Delta^4$-3,20-diketosteroid with hydrogen cyanide to produce a $\Delta^4$-3,20-diketosteroid-20-cyanohydrin. The term, hydrogen cyanide, wherever used, is inclusive of the gas hydrogen cyanide, hydrocyanic acid, and hydrogen cyanide formed in situ such as, for example, by the reaction of a salt of hydrocyanic acid with an acid.

The art is apprised of the addition of hydrogen cyanide to various aliphatic and aromatic ketones. This reaction is well-known and frequently used in the synthesis of a variety of compounds from ketones and in the characterization and purification of ketones. Migrdichian, "Organic Cyanogen Compounds," 173 to 179 (1947), lists the cyanohydrins of some typical ketones. Included in the list is a conjugated ketone, ethyl vinyl ketone, which reacts with hydrogen cyanide to produce $\beta$-cyano-diethyl ketone and $\beta$-cyano-diethyl ketone cyanohydrin, the reaction taking place in the former case at the double bond and in the latter instance at both the double bond and the keto function.

Moreover, the art is apprised of the addition of hydrogen cyanide to 20-ketosteroids. For example, Heer and Miescher, Helv. Chim. Acta, 34, 359 to 372 (1951) and Sarett, U. S. Patents 2,541,104, 2,541,105, 2,558,784, 2,558,785, and 2,558,786, disclose methods of preparing 20-ketopregnane-20-cyanohydrins from 20-ketopregnanes. It is noteworthy that in disclosing therein a method of preparing cortisone and other hormones, the $\Delta^4$-3-keto function present in said hormones was introduced by a multiple step process subsequent to the cyanohydrin addition reaction thereby ensuring cyanohydrin addition only at the 20-ketone and negating the possibility of a reaction with the conjugated $\Delta^4$-3-keto function typified by the addition of hydrogen cyanide to the conjugated ethyl vinyl ketone described above.

When following the method of the present invention, the reaction of hydrogen cyanide with a $\Delta^4$-3,20-diketosteroid is productive of a $\Delta^4$-3,20-diketosteroid-20-cyanohydrin. The conjugated 3-ketone, which could react with hydrogen cyanide to produce three different addition reaction products, quite unexpectedly was found to be far less reactive than the 20-ketone, and almost quantitative conversions of a $\Delta^4$-3,20-diketosteriod to a $\Delta^4$-3,20-diketosteroid-20-cyanohydrin are frequently achieved when following the method of the present invention.

The novel compounds of the present invention are useful precursors of hormones and other steroids. For example, reacting 21-acetoxy-11-ketoprogesterone with hydrogen cyanide according to the method of the present invention produces 21-acetoxy-11-ketoprogesterone-20-cyanohydrin which, when reacted with a dehydrating agent such as, for example, phosphorous oxychloride, followed by oxidation with an oxidizing agent such as, for example, osmium tetraoxide or potassium permanganate, and thereafter hydrolyzing the reaction product, produces cortisone. The novel compounds of the present invention, moreover, are effective bactericides and pesticides. When a compound of the present invention is contacted at room temperature with solvents containing small quantities of methyl or ethyl alcohol in the absence of excess hydrogen cyanide, rapid conversion to the corresponding free 20-keto compound is effected with the concomitant release of hydrogen cyanide.

In carrying out the process of the present invention, a $\Delta^4$-3,20-diketosteroid is contacted with an excess of hydrogen cyanide in a solvent such as, for example, a mixture of methyl alcohol or ethyl alcohol and acetic acid or formic acid, or the like, at a temperature between about room temperature and about minus forty degrees centigrade. The effective lower temperature limit is usually that temperature at which the $\Delta^4$-3,20-diketosteroid precipitates from the reaction mixture. At temperatures above about room temperature, accompanying reactions such as tarring and decomposition cause corresponding reduction in yields of the desired $\Delta^4$-3,20-diketosteroid-20-cyanohydrin. The hydrogen cyanide used in the reaction can be liquid or gaseous hydrogen cyanide, solutions thereof, or hydrogen cyanide formed in situ such as, for example, by the reaction of acetic or formic acid with a metal salt of hydrocyanic acid. Acetone cyanohydrin may also be used as an in situ source of hydrogen cyanide. The thus-produced $\Delta^4$-3,20-diketosteroid-20-cyanohydrin can then be isolated by the addition of ice-cold water and thereafter filtering or extracting the precipitated product. Alternatively, the reaction product can be isolated by distillation of the solvent from the reaction mixture at reduced pressure. The thus-isolated reaction product can be purified by chromatoactive separation or by fractional crystallization from a suitable solvent, preferably alcohol free. In contrast to the 20-cyanohydrins of ketosteroids which do not possess a $\Delta^4$-3-keto function, the starting $\Delta^4$-3,20-diketosteroid can be regenerated rapidly and often quantitatively from the thus-produced $\Delta^4$-3,20-diketosteroid-20-cyanohydrin by dissolving the latter in alcohol or an alcohol containing solvent. The products of the present invention, therefore, are excellent purifiable, crystalline forms of the corresponding $\Delta^4$-3,20-diketosteroids.

The following example are illustrative of the process and products of the present invention but are not to be construed as limiting.

PREPARATION 1.—11α-HYDROXYPROGESTERONE

A medium was prepared from five milliliters of corn steep liquor, twenty grams of Edamine commercial lactalbumin digest, and fifty milligrams of Cerelose commercial dextrose, per liter of tap water and adjusted to a pH of between about 5.5 and about 5.9. To four liters of this medium containing a 32 to 48 hour growth, at room temperature with aeration, of *Rhizopus arrhizus*, was added one gram of progesterone in fifty milliliters of acetone, providing a suspension of the steroid in the water of the culture. The culture was then incubated at room temperature for 48 hours. At the end of this time the pH of the medium was 3.5 and the fermentation liquor and mycelia were extracted successively with three one-liter portions, one two-liter portion, and one one-liter portion of methylene chloride. The methylene chloride extracts were combined and washed with two 400-milliliter portions of two percent aqueous sodium bicarbonate solution and three 500-milliliter portions of water. The methylene chloride extract was evaporated to dryness in vacuo and the solids taken up in fifty milliliters of methylene chloride. The solution was transferred to a 100-milliliter beaker and evaporated by a stream of air. The solids, weighing 1.585 grams, were dissolved in five milliliters of hot methanol and allowed to cool slowly at room temperature, whereupon 75 milligrams of crystals separated out. The mother liquor was freed of solvent by aeration, and the residue dissolved in fifty milliliters of benzene and chromatographed over alumina ($Al_2O_3$). Fifty grams of acid-washed alumina, dried at 45 degrees centigrade, was used as adsorbent and 100-milliliter portions of solvents were used to develop the column. The solvents and the order used were as follows: benzene, benzene, benzene plus 5 percent ether, benzene plus 5 percent ether, benzene plus 10 percent ether, benzene plus 10 percent ether, benzene plus 10 percent ether, benzene plus 50 percent ether, benzene plus 50 percent ether, ether, ether plus 5 percent ether, ether plus 5 percent chloroform, ether plus 10 percent chloroform, ether plus 10 percent chloroform, ether plus 50 percent chloroform, ether plus 50 percent chloroform, chloroform, chloroform, chloroform plus 5 percent acetone, chloroform plus 5 percent acetone, chloroform plus 10 percent acetone, chloroform plus 10 percent acetone, chloroform plus 50 percent acetone, chloroform plus 50 percent acetone, acetone, acetone, acetone plus 5 percent methanol, acetone plus 5 percent methanol, acetone plus 10 percent methanol, acetone plus 10 percent methanol, acetone plus 50 percent methanol, acetone plus 50 percent methanol. The chloroform and chloroform plus 5 per cent acetone eluates were combined, evaporated to dryness, and the residue dissolved in two milliliters of hot methanol and filtered. After overnight refrigeration, 171 milligrams of crystalline 11α-hydroxyprogesterone, melting at 166 to 167 degrees centigrade, was obtained. A recrystallized sample gave the following constants: melting point, 166–167 degrees centigrade; $[\alpha]_D^{20}$ of plus 175.9 degrees (chloroform).

Analysis:
Percent calculated for $C_{21}H_{30}O_3$---- C, 76.4; H, 9.10
Found ---------------------------- C, 76.6; H, 8.92

The structure of this product was further established by its conversion, with chromic acid in acetic acid, to 11-ketoprogesterone [Reichstein, Helv. Chim. Acta, 23, 684 (1940); ibid. 26, 721 (1943)].

PREPARATION 2.—11α-ACETOXYPROGESTERONE

Twenty milligrams of 11α-hydroxyprogesterone was mixed with 0.6 milliliter of pyridine and 0.6 milliliter of acetic anhydride. After sixteen hours at room temperature, 25 milliliters of water was added. After one hour, the preparation was refrigerated to cause crystallization. The crystals which formed were washed with water and dried to yield 16.1 milligrams of 11α-acetoxyprogesterone having a melting point of 175 to 177 degrees centigrade, $[\alpha]_D^{26}$ of plus 227.8 degrees (one gram in acetone), $k_{238}$ of 247. Infrared analysis indicated the absence of the hydroxyl group and the presence of a new acetoxy group.

Analysis:
Percent calculated for acetoxyprogesterone
C, 74.0; H, 8.83
Found ---------------------------- C, 74.33; H, 8.78

11α-Hydroxyprogesterone can be converted into other 11α-acyloxy derivatives according to known acylation procedures, as by reaction with ketene, ketenes or an appropriate acid, acid anhydride or acyl halide, in an organic solvent such as pyridine or the like. Representative esters of 11α-hydroxyprogesterone thus prepared include one to eight carbon atom carboxylic acid acyloxy esters of saturated or unsaturated aliphatic or cycloaliphatic, aryl, alkaryl, aralkyl, mono, di or polycarboxylic acids, the half- and di-esters of the 11α-hydroxyprogesterone with malonic, maleic, succinic, glutaric and adipic acids, or the like, producing acyloxy groups such as, for example, formyloxy, acetoxy, propionyloxy, butyryloxy, valeryloxy, hexanoyloxy, heptanoyloxy, octanoyloxy, benzoxy, phenylacetoxy, toluoyloxy, naphthoyloxy, cyclopentanoyloxy, cyclopentylpropionyloxy, acryloxy, cyclohexanoyloxy, or the like. The acyl groups may also contain non-interfering substituents, such as mono or poly halo, chloro, bromo, hydroxy, methoxy or the like if desired.

*Example 1.—Progesterone-20-cyanohydrin (20-hydroxy-20-cyano-4-pregnene-3-one)*

A solution of 25 grams of progesterone dissolved in forty milliliters of ethanol, 200 milliliters of acetic acid, and twenty milliliters of 98 percent formic acid was cooled to zero degrees centigrade in an ice-salt bath and 104 grams of potassium cyanide was added portionwise thereto while maintaining the temperature of the stirred reaction mixture below ten degrees centigrade. The cooling bath was then removed and the reaction mixture was stirred for two hours during which time the temperature of the reaction mixture was allowed to rise to about ten degrees centigrade. The reaction mixture was maintained at about ten degrees centigrade for about sixteen hours whereafter 1.5 liters of water was added thereto and the quantitative yield of 20-cyanohydrin of progesterone which precipitated was filtered, dried and found to weigh 27.1 grams. The cyanohydrin was thereafter triturated with two liters of water and the whole extracted with two liters of methylene chloride which was thereafter separated, washed with successive portions of water, a ten percent sodium bicarbonate solution, water, a saturated sodium chloride solution and then dried with anhydrous sodium sulfate. The dry methylene chloride solution was evaporated to dryness at reduced pressure and the residue crystallized from 1.5 liters of dioxane. There was thus obtained 22 grams (82 percent of the theoretical) of progesterone-20-cyanohydrin, melting at 202 to 206 degrees centigrade and having an $[\alpha]_D$ of plus 111 degrees. The infrared and ultraviolet spectra were consistent with the structure.

*Analysis:*
Percent calculated for $C_{22}H_{31}NO_2$
         C, 77.4; H, 9.15; N, 4.10
Found _____ C, 77.56; H, 9.22; N, 4.08

*Example 2.—11-ketoprogesterone-20-cyanohydrin*

Following the procedure of Example 1, using 1.50 grams of 11-ketoprogesterone and 6.5 grams of potassium cyanide in a mixture of eighteen milliliters of absolute ethanol and twelve milliliters of glacial acetic acid at room temperature, there was obtained 1.44 grams of 11-ketoprogesterone-20-cyanohydrin which melted, after crystallization from dimethylformamide, at 174 to 175 degrees centigrade and had infrared and ultraviolet spectra consistent with the structure.

*Analysis:*
Percent calculated for $C_{22}H_{29}NO_3$____ N, 3.94
Found _____ N, 4.00

*Example 3.—21-acetoxyprogesterone-20-cyanohydrin (21-acetoxy-20-hydroxy-20-cyano-4-pregnene-3-one)*

Following the procedure of Example 1, using 3.0 grams of 21-acetoxyprogesterone and 13.0 grams of potassium cyanide in a mixture of 36 milliliters of absolute ethanol and 24 milliliters of glacial acetic acid, 2.6 grams of 21-acetoxyprogesterone-20-cyanohydrin (a yield of 85 percent of the theoretical) was obtained which melted at 129 to 130 degrees centigrade after crystallization from dimethylformamide. The infrared and ultraviolet spectra of the product were consistent with the structure.

*Analysis:*
Percent calculated for $C_{24}H_{33}NO_4$____ N, 3.51
Found _____ N, 4.01

Similarly, other 21-acyloxy esters of 21-hydroxyprogesterone are converted to the corresponding 20-cyanohydrins by reaction with potassium cyanide in acetic acid and ethanol. The 20-cyanohydrins of the following compounds are thus prepared: 21-formyloxyprogesterone, 21-propionyloxyprogesterone, 21-butyryloxyprogesterone, 21-valeryloxyprogesterone, 21-hexanoyloxyprogesterone, 21-heptanoyloxyprogesterone, 21-octanoyloxyprogesterone, 21-benzoxyprogesterone, and others.

*Example 4.—11α-hydroxygesterone-20-cyanohydrin (11α,20-dihydroxy-20-cyano-4-pregnene-3-one)*

Following the procedure of Example 1, using 1.50 grams of 11α-hydroxyprogesterone and 6.5 grams of potassium cyanide in eighteen milliliters of absolute ethanol and seven milliliters of glacial acetic acid, with a reaction time of two hours, 11α-hydroxyprogesterone-20-cyanohydrin was obtained in a yield of 75 percent of the theoretical. Infrared and ultraviolet spectra analyses confirmed the structure.

*Example 5.—11α-acetoxyprogesterone-20-cyanohydrin*

In essentially the same manner as described in Example 1, 11α-acetoxyprogesterone-20-cyanohydrin is prepared from 11α-acetoxyprogesterone and potassium cyanide in acetic acid and ethanol.

Similarly, other 11α-acyloxy esters of 11α-hydroxyprogesterone are concerted to the corresponding 20-cyanohydrins by reaction with potassium cyanide in acetic acid and ethanol. The 20-cyanohydrins of the following compounds are thus-prepared: 11α-formyloxyprogesterone, 11α-propionyloxyprogesterone, 11α-butyrloxyprogesterone, 11α-valeryloxyprogesterone, 11α-hexanoyloxyprogesterone, 11α-heptanoyloxyprogesterone, 11α-octanoyloxyprogesterone, 11α-benzoxyprogesterone, and others.

In the manner described in Examples 1 through 5, by reacting a steroid which possesses a $\Delta^4$-3,20-diketo group with potassium cyanide or sodium cyanide in acetic or formic acid, other $\Delta^4$-3,20-diketosteroid-20-cyanohydrins are prepared. Compounds thus-prepared include 11β-hydroxyprogesterone-20-cyanohydrin from 11β-hydroxyprogesterone, 11α,21-dihydroxyprogesterone-20-cyanohydrin from 11α,21-dihydroxyprogesterone, 11β,21-dihydroxygesterone-20-cyanohydrin from 11β,21-dihydroxyprogesterone (corticosterone), 11-keto-21-hydroxyprogesterone-20-cyanohydrin from 11-keto-21-hydroxyprogesterone, and 20-cyanohydrins of compounds such as, for example, 11α-acyloxyprogesterone, 21-acyloxyprogesterone, 11α,21-diacyloxyprogesterone, 11-keto-21-acyloxyprogesterone, 11β-hydroxy-21-acyloxyprogesterone wherein acyl is the acyl radical of a saturated or unsaturated aliphatic or cycloaliphatic, aryl, alkaryl, aralkyl, mono, di or polycarboxylic acid, malonic, maleic, succinic, glutaric, adipic acid, or the like, forming acyloxy groups such as, for example, formyloxy, acetoxy, propionyloxy, butyryloxy, valeryloxy, hexanoyloxy, heptanoyloxy, octanoyloxy, benzoxy, phenylacetoxy, dimethylacetoxy, toluoyloxy, naphthoyloxy, cyclopentanoyloxy, $\beta$-cyclopentylpropionyloxy, trimethylacetoxy, acrylyloxy, cyclohexanoyloxy, and particularly lower-alkanoyloxy, or the like. The acyl groups may also contain non-interfering substituents, such as mono or poly halo, chloro, bromo, hydroxy, methoxy or the like, if desired. In those compounds where it is possible to have di-esters the acyloxy groups may be alike or different. For example, 11α,21-dihydroxyprogesterone can be acylated with about one molar equivalent of an acylating agent to produce the 21-mono-ester which in turn may be acylated in the 11-position, to produce a different ester in the 11-position. The thus-produced di-ester can be converted, following the process of the present invention, to the corresponding 20-cyanohydrin.

It is to be understood that the invention is not to be limited to the exact details of operation or exact compounds shown and described as obvious modifications and equivalents will be apparent to one skilled in the art and the invention is therefore to be limited only by the scope of the appended claims.

I claim:
1. A $\Delta^4$-3,20-diketopregnene-20-cyanohydrin having a 17-hydrogen.
2. A $\Delta^4$-3,11,20-triketopregnene-20-cyanohydrin having a 17-hydrogen.
3. A $\Delta^4$-3,20-diketo-11α-hydroxypregnene-20-cyanohydrin having a 17-hydrogen.
4. A $\Delta^4$-3,20-diketo-21-acyloxypregnene-20-cyanohydrin having a 17-hydrogen.
5. A $\Delta^4$-3,11,20-triketo-21-acyloxypregnene-20-cyanohydrin having a 17-hydrogen.
6. Progesterone-20-cyanohydrin.
7. 11-ketoprogesterone-20-cyanohydrin.
8. 11α-hydroxyprogesterone-20-cyanohydrin.
9. 21-acetoxyprogesterone-20-cyanohydrin.
10. 11-keto-21-acetoxyprogesterone-20-cyanohydrin.
11. A process for the production of a $\Delta^4$-3,20-diketosteroid-20-cyanohydrin which comprises: reacting a $\Delta^4$-3,20-diketosteroid with hydrogen cyanide to produce a $\Delta^4$-3,20-diketosteroid-20-cyanohydrin.
12. A process for the production of a $\Delta^4$-3,20-diketosteroid-20-cyanohydrin which comprises: reacting a $\Delta^4$-3,20-diketosteroid with hydrogen cyanide at a temperature between about minus forty degrees centigrade and about room temperature to produce a $\Delta^4$-3,20-diketosteroid-20-cyanohydrin.
13. A process for the production of a $\Delta^4$-3,20-diketopregnene-20-cyanohydrin which comprises: reacting a $\Delta^4$-3,20-diketopregnene with hydrogen cyanide at a temperature between about minus forty degrees centigrade and about room temperature to produce a $\Delta^4$-3,20-diketopregnene-20-cyanohydrin.
14. A process for the production of a $\Delta^4$-3,11,20-triketopregnene-20-cyanohydrin which comprises: reacting a $\Delta^4$-3,11,20-triketopregnene with hydrogen cyanide at a temperature between about minus forty degrees centigrade and about room temperature to produce a $\Delta^4$-3,11,20-triketopregnene-20-cyanohydrin.
15. A process for the production of a $\Delta^4$-3,20-diketo-21-acyloxypregnene-20-cyanohydrin which comprises: reacting a $\Delta^4$-3,20-diketo-21-acyloxypregnene with hydrogen cyanide at a temperature between about minus forty degrees centigrade and about room temperature to produce a $\Delta^4$-3,20-diketo-21-acyloxypregnene-20-cyanohydrin.
16. A process for the production of a $\Delta^4$-3,20-diketopregnene-20-cyanohydrin which comprises: reacting a $\Delta^4$-3,20-diketopregnene with an excess of an alkali metal salt of hydrocyanic acid in an acetic acid and alcohol containing solvent to produce a $\Delta^4$-3,20-diketopregnene-20-cyanohydrin.
17. A process for the production of progesterone-20-cyanohydrin which comprises: reacting progesterone with an excess of an alkali metal salt of hydrocyanic acid in an alcohol and acetic acid containing solvent to produce progesterone-20-cyanohydrin.
18. A process for the production of 11-ketoprogesterone-20-cyanohydrin which comprises: reacting 11-ketoprogesterone with an excess of an alkali metal salt of hydrocyanic acid in an alcohol and acetic acid containing solvent to produce 11-ketoprogesterone-20-cyanohydrin.
19. A process for the production of 11α-hydroxyprogesterone-20-cyanohydrin which comprises: reacting 11α-hydroxyprogesterone with an excess of an alkali metal salt of hydrocyanic acid in an alcohol and acetic acid containing solvent to produce 11α-hydroxyprogesterone-20-cyanohydrin.
20. A process for the production of 11-keto-21-acetoxyprogesterone-20-cyanohydrin which comprises: reacting 11-keto-21-acetoxyprogesterone with an excess of an alkali metal salt of hydrocyanic acid in an alcohol and acetic acid containing solvent to produce 11-keto-21-acetoxyprogesterone-20-cyanohydrin.

GEORGE SLOMP, Jr.

No references cited.